(12) United States Patent
Hayashida et al.

(10) Patent No.: US 7,010,091 B2
(45) Date of Patent: Mar. 7, 2006

(54) PHOTODETECTING MEANS, X-RAY SENSING METHOD, X-RAY SENSING APPARATUS, AND PHOTOELECTRIC CONVERSION ELEMENT

(75) Inventors: Shinsuke Hayashida, Tochigi (JP); Toshikazu Tamura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 10/447,819

(22) Filed: May 28, 2003

(65) Prior Publication Data

US 2003/0223540 A1    Dec. 4, 2003

(30) Foreign Application Priority Data

May 28, 2002 (JP) .............................. 2002-154205
Apr. 18, 2003 (JP) .............................. 2003-114325

(51) Int. Cl.
*H05G 1/58* (2006.01)
*H05G 1/64* (2006.01)

(52) U.S. Cl. ..................... 378/98.8; 378/62; 378/115; 378/116; 250/370.09

(58) Field of Classification Search ................. 378/19, 378/62, 91, 95, 98.8, 116, 189, 206, 115; 250/208.1, 214 R, 214 A, 370.09, 370.1, 250/370.11
See application file for complete search history.

(56) References Cited

U.S. PATENT DOCUMENTS

| | | | | |
|---|---|---|---|---|
| 5,058,190 A | * | 10/1991 | Levitt et al. ................. 382/324 |
| 5,530,935 A | * | 6/1996 | Dillen ........................ 378/98.2 |
| 6,047,042 A | * | 4/2000 | Khutoryansky et al. ...... 378/62 |
| 6,084,939 A | * | 7/2000 | Tamura ...................... 378/98.2 |
| 6,084,940 A | * | 7/2000 | Van Asten ................. 378/98.7 |
| 6,208,710 B1 | * | 3/2001 | Nagai ......................... 378/108 |
| 6,229,873 B1 | * | 5/2001 | Bani-Hashemi et al. ....... 378/63 |
| 6,292,534 B1 | * | 9/2001 | Linders et al. ............. 378/98.2 |
| 6,404,852 B1 | * | 6/2002 | Petrick et al. ............. 378/98.8 |
| 6,795,526 B1 | * | 9/2004 | Kump et al. ................ 378/116 |

FOREIGN PATENT DOCUMENTS

| | | |
|---|---|---|
| JP | H06-217973 | 8/1993 |
| JP | 9-257944 | 10/1997 |
| JP | H10-201750 | 8/1998 |

(Continued)

OTHER PUBLICATIONS

Nicholas Tsoulfanidis. Measurement and Detection of Radiation, Second Edition (Washington, DC: Taylor & Francis, 1995), p. 339-344.*

(Continued)

*Primary Examiner*—Allen C. Ho
(74) *Attorney, Agent, or Firm*—Morgan & Finnegan, L.L.P.

(57) ABSTRACT

An X-ray sensing apparatus with which reduction is achieved in the amount of electric power consumed to drive an X-ray sensor, including: a sensing unit including a plurality of photoelectric conversion elements each converting light into an electric signal; a driving range designating unit for designating a driving range for driving each of the plurality of photoelectric conversion elements included in the sensing unit; a drive unit for driving the photoelectric conversion element in the driving range designated by the driving range designating unit; a reading range designating unit for designating a reading range of the photoelectric conversion element driven by said driving unit; and a signal reading unit for reading out an output of the photoelectric conversion element in the reading range designated by the reading range designating unit.

4 Claims, 11 Drawing Sheets

FOREIGN PATENT DOCUMENTS

| JP | H11-009581  | 1/1999  |
|----|-------------|---------|
| JP | H11-318877  | 11/1999 |
| JP | 21000-004406 | 1/2000 |
| JP | 2000-271107 | 10/2000 |
| JP | 2000-350719 | 12/2000 |
| JP | 2001-249183 | 9/2001  |
| JP | 2002-165142 | 6/2002  |

OTHER PUBLICATIONS

A Japanese Office action (Notification of Reasons for Rejection) issued on Sep. 28, 2004 for Appl. No. 2003-114325 and an English translation for the same.

A Japanese Office action (Notification of Reasons for Rejection) issued on Dec. 14, 2004 for Appl. No. 2003-114325 and an English translation for the same.

Englishi translation of portions of JPLO 2002-165142.
Englishi translation of portions of JPLO 2001-249183.
Englishi translation of portions of JPLO 2000-350719.
Englishi translation of portions of JPLO 2000-004406.
Englishi translation of portions of JPLO H11-318877.
Englishi translation of portions of JPLO H11-009581.
Englishi translation of portions of JPLO H10-201750.
Englishi translation of portions of JPLO H06-217973.

* cited by examiner

PHOTODETECTING MEANS, X-RAY SENSING METHOD, X-RAY SENSING APPARATUS, AND PHOTOELECTRIC CONVERSION ELEMENT

BACKGROUND OF THE INVENTION

1. Field of the Invention

The present invention relates to an X-ray sensing method and apparatus with a photoelectric conversion element driving control, and a photoelectric conversion element. In particular, the present invention relates to an X-ray sensing method and apparatus, in which consideration is given to a photoelectric conversion element driving range and reading range, and a photoelectric conversion element.

2. Related Background Art

With a conventional X-ray sensing apparatus, an X-ray beam is projected from an X-ray source so as to pass through an analysis subject such as a medical patient, and the X-ray beam having passed through the subject is sensed by a screen film cassette, a film auto-changer, computed radiography (CR), a flat panel detector (FPD), or the like.

In the field of X-ray radiographs, a high-resolution solid-state X-ray detector using the FPD is proposed. This detector includes an X-ray sensor comprising a two-dimensional array of photoelectric conversion elements such as photodiodes typically, in which 3000 to 4000 photoelectric conversion elements are arranged in each dimension of the array. Each photoelectric conversion element generates an electric signal corresponding to the amount of X rays incident onto the X-ray sensor. With this construction, a subject is positioned between the X-ray source and the X-ray sensor, and the amount of X rays having passed through the subject is converted into electric signals, thereby obtaining an X-ray image of the subject. Also, the signal from each photoelectric conversion element is independently read, digitized, subjected to image processing, and stored and displayed. Such a detector is disclosed in Japanese Patent Application Laid-Open No. 09-257944, for instance.

Further, with the reduction in thickness and the improvement in high reliability techniques, the solid-state X-ray detector using the FPD is also on its way to size and thickness reduction, while the X-ray screen film cassette has attained such the reduction.

The solid-state X-ray detector using the FPD, however, suffers from a problem that a large amount of electric power is consumed to drive the photoelectric conversion elements of the X-ray sensor. In particular, when a battery is built into a thin and small-sized X-ray digital sensing apparatus, for instance, it is required to attain a driving in which the amount of electric power consumed by the X-ray sensing apparatus at the time of ordinary sensing can be reduced.

SUMMARY OF THE INVENTION

An object of the present invention is therefore to provide an X-ray sensing apparatus, an X-ray sensing method, and a photoelectric conversion element that are capable of saving electric power consumed to drive an X-ray sensor.

According to the present invention, the foregoing object is attained by providing a photoelectric conversion element including: photodetecting means for converting light into an electric signal; amplifying means for amplifying the electric signal outputted from the photodetecting means; and drive means for adjusting a power source of the amplifying means.

Further, the foregoing object is also attained by providing an X-ray sensing apparatus including: sensing means including a plurality of photoelectric conversion elements each converting light into an electric signal; driving range designating means for designating a driving range for driving each of the plurality of photoelectric conversion elements included in the sensing means; drive means for driving each photoelectric conversion element in the driving range designated by the driving range designating means; and a signal reading means for reading out an output of the photoelectric conversion element driven by the drive means.

Other objects, features and advantages of the invention will be apparent from the following descriptions taken in conjunction with the accompanying drawings in which like reference characters designate the same or similar parts through the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DETAILED DESCRIPTION OF THE PREFERRED EMBODIMENTS

Preferred embodiments of the present invention will be described in detail in accordance with the accompanying drawings.

First Embodiment

Figure 1:
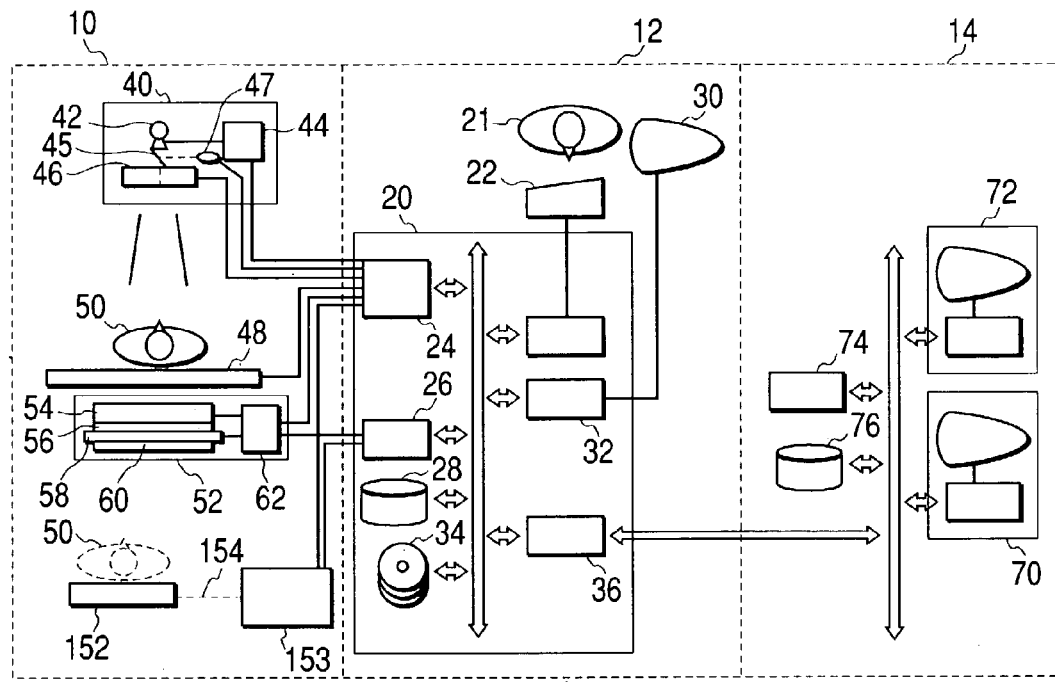
FIG. 1 shows the construction of an X-ray sensing system.

Hereinafter, a first embodiment of the present invention will be described in detail with reference to the drawings. FIG. 1 shows a construction block diagram of an X-ray sensing system of an embodiment of the present invention. In this drawing, reference numeral 10 denotes an X-ray room, numeral 12, an X-ray control room, and numeral 14, a diagnosis and other operation room.

In the X-ray control room 12, there is installed a system controller 20 that controls the overall operation of the present X-ray sensing system. An operator interface 22 composed of an X-ray exposure request switch, a touch panel, a mouse, a keyboard, a joystick, a foot switch, and the like is operated by an operator 21 to input various instructions into the system controller 20. The contents of the instructions inputted by the operator 21 are, for instance, a sensing condition (such as whether a still image or a moving image is to be sensed, an X-ray tube voltage, a tube current, and an X-ray irradiation time), a sensing timing, an image processing condition, a subject ID, a method of processing a sensed image, and the like. In addition, the instruction contents also include a method of setting a sensing field, the confirmation of the sensing field, and the like.

A sensing control circuit 24 of the system controller 20 controls an X-ray sensing system installed in the X-ray room 10, and an image processing circuit 26 thereof performs image processing on an image sensed by the X-ray sensing system in the X-ray room 10. The image processing performed by the image processing circuit 26 is, for instance, irradiation field recognition, image data correction, spatial filtering, recursive processing, gradation processing, scattered ray correction, dynamic range (DR) compression processing, and the like. A large-capacity high-speed storage apparatus 28 is used to store basic image data processed by the image processing circuit 26 and is, for instance, composed of a hard disc array such as RAID. Reference numeral 30 denotes a monitor display (hereinafter simply referred to as the "monitor") for displaying an image, numeral 32, a display controller for performing control to cause the monitor 30 to display various characters and images, numeral 34, an external large-capacity storage apparatus (magneto-optical disc, for instance), and numeral 36, a LAN board for establishing connection between the apparatus in the X-ray control room 12 and the apparatus in the diagnosis and other operation room 14 and transferring images and the like sensed in the X-ray room 10 to the apparatus in the diagnosis and other operation room 14.

In the X-ray room 10, there is installed an X-ray generator 40 that generates X rays. The X-ray generator 40 includes an X-ray tube 42 that generates X rays, a high voltage generator 44 that drives the X-ray tube 42 under control of the sensing control circuit 24, and an X-ray iris 46 that narrows an X-ray beam generated by the X-ray tube 42 to a desired sensing field. Reference numeral 47 denotes a CCD camera. In this embodiment, this CCD camera is disposed based on an alignment that is optically equal to the focal point of the X-ray tube, thereby obtaining a construction where it is possible to monitor the X-rays radiated from the X-ray tube 42 by analyzing an image picked-up by the CCD camera 47.

A subject (patient) 50 lies down on a sensing bed 48. The sensing bed 48 is driven in accordance with a control signal from the sensing control circuit 24 and it is possible to change the direction of the subject with reference to the X-ray beam from the X-ray generator 40. Below the sensing bed 48, there is disposed an X-ray detector 52 that detects an X-ray beam having passed through the subject 50 and the sensing bed 48.

Next, there will be described the construction of the X-ray detector 52 shown in FIG. 1. The X-ray detector 52 includes a lamination body composed of a grid 54, a scintillator 56, an X-ray sensor (sensing means) 58 constructed as a two-dimensional array of a plurality of photoelectric conversion elements, and an X-ray exposure amount monitor 60. The X-ray detector 52 also includes a drive circuit 62 for driving the X-ray sensor (sensing means) 58. The grid 54 is provided in order to reduce an influence of X-ray scattering that occurs when X rays pass through the subject 50. The grid 54 is composed of an X-ray low-absorption member and an X-ray high-absorption member. In more detail, the grid 54 has a stripe structure of Al and Pb, for instance. In order to prevent a situation where moiré occurs due to a grating ratio between the X-ray sensor (sensing means) 58 and the grid 54, the X-ray detector 52 makes the grid 54 vibrate at the time of X-ray irradiation on the basis of a setting by the sensing control circuit 24. Whether the grid 54 is to be vibrated is determined by the operator 21 and it is possible to perform the sensing while fixing the grid 54. When the sensing is performed while fixing the grid 54, it is preferable to perform the setting so that moiré, such as aliasing or beat, hardly occurs due to the grating ratio between the X-ray sensor (sensing means) 58 and the grid 54. Also, a grid stripe itself is captured in an image, so that it is also preferable to weaken the frequency of the grid strip through image processing.

In the scintillator 56, the source material of a fluorescent member is excited by high-energy X rays (absorbs the X rays), and fluorescent light in a visible region is generated by recombination energy generated at that time. That is, the scintillator 56 converts X rays into visible light. This fluorescent light is, for instance, generated by the source material itself such as $CaWo_4$ or $CdWo_4$, or by a luminescence center material, such as CsI:Tl or Zns:Ag, added to the source material. The X-ray sensor (sensing means) 58 converts the visible light generated by the scintillator 56 into electric signals.

Also, in this embodiment, the scintillator 56 and the X-ray sensor (sensing means) 58 are constructed as separated construction elements, although the present invention is applicable to an X-ray sensor (sensing means) 58 constructed by using photoelectric conversion elements that directly convert X rays into electrons. An example of such photoelectric conversion elements is a photoelectric conversion element composed of a light-receiving portion (made of amorphous Se, $PbI_2$, or the like), an amorphous silicon TFT, and the like.

The X-ray exposure amount monitor 60 is arranged for the sake of monitoring the amount of X rays having passed through the sensing bed 48 and the subject 50. It does not matter whether the X-ray exposure amount monitor 60 directly detects the X rays by using a crystal silicon light-receiving element or the like or detects fluorescent light generated by the scintillator 56. In this embodiment, the X-ray exposure amount monitor 60 is composed of an amorphous silicon light-receiving element formed as a layer on the underside of the substrate of the X-ray sensor (sensing means) 58, detects visible light (proportional to the amount of X rays) having passed through the X-ray sensor (sensing means) 58, and transmits information of the amount of the detected light to the sensing control circuit 24. The sensing control circuit 24 controls the high voltage generator 44 based on the information from the X-ray exposure amount monitor 60, thereby adjusting the amount of X rays. The drive circuit 62 drives the photoelectric conversion elements constituting the photodetector array 58 under control of the sensing control circuit 24, and reads out a signal from each pixel.

Next, there will be described a thin X-ray detector 152 shown in FIG. 1. In the drawing, a single thin X-ray detector 152 is illustrated as a representative of a plurality of kinds of sensors, although it is possible to replace the thin X-ray detector 152 with another thin X-ray detector 152 having a different spatial resolution and a different sensing field size. The most significant difference between the X-ray detector 52 and the thin X-ray detector 152 is that the thickness of the thin X-ray detector 152 is equal to or less than around 20 mm that is comparable to the thickness of a film-screen-based cassette. Other significant differences therebetween are, for instance, that the thin X-ray detector 152 is not provided with the grid 54, but with a simple power source and a large-capacity memory (capable of storing 10 to 20 images), and that the thin X-ray detector is capable of performing exchange of an image signal and a control signal with a relay device 153 in a cableless manner. The lamination body composed of the scintillator 56, the X-ray sensor (sensing means) 58, the X-ray exposure amount monitor 60 and the drive circuit 62 for driving the X-ray sensor (sensing means) 58. It is possible for the thin X-ray detector 152 to operate regardless of whether a cable 154 is used. When the cable 154 is used, it is possible for the thin X-ray detector 152 to perform within a shorter period of time image transfer at high rate, so that operations for sensing, processing, and confirming an image after X-ray sensing are completed. As to this thin X-ray detector 152, another thin X-ray detector 152 is also connected to the system controller 20 through the relay device 153 in order to sense the limbs or the like of another subject, for instance.

Next, there will be described the diagnosis and other operation room 14 in FIG. 1. In this diagnosis and other operation room 14, there is installed an image processing terminal 70 that may be connected to an HIS/RIS or the like for designating information on a subject to be sensed, a sensing method, and the like through the LAN board, and that performs image processing on an image from the LAN board 36, and supports a diagnosis of the image. In the diagnosis and other operation room 14, there are also installed an image display monitor 72 that displays an image (moving image/still image) from the LAN board 36, an image printer 74, and a file server 76 that stores image data.

It should be noted here that a control signal sent from the system controller 20 to each apparatus may be generated by an instruction issued from the operator interface 22 in the X-ray control room 12 or from the image processing terminal 70 in the diagnosis and other operation room 14.

A basic operation of the system controller 20 shown in FIG. 1 will be described below. The system controller 20 instructs a sensing condition which is based on an instruction issued from the operator 21, to the sensing control circuit 24 that controls the sequence of an X-ray sensing process. Based on this instruction, the sensing control circuit 24 drives the X-ray generator 40, the sensing bed 48, and the X-ray detector 52, thereby sensing an X-ray image. An X-ray image signal outputted from the X-ray detector 52 is supplied to the image processing circuit 26, is subjected to image processing designated by the operator 21, and is displayed as an image on the monitor 30. Concurrently with this displaying, the X-ray image signal is stored in the storage apparatus 28 as basic image data. The system controller 20 further carries out image re-processing, displaying of its result, transferring and storing image data to an apparatus on the network, image displaying, film printing, and the like, based on instructions issued from the operator 21.

The basic operation of the system shown in FIG. 1 will be described by following a signal flow. The high voltage generator 44 of the X-ray generator 40 applies a high voltage for X-ray generation to the X-ray tube 42 in accordance with a control signal from the sensing control circuit 24. As a result of this operation, the X-ray tube 42 generates an X-ray beam. The generated X-ray beam is irradiated onto the subject 50 (patient) through the X-ray iris 46. The X-ray iris 46 is controlled by the sensing control circuit 24 with reference to a position at which the X-ray beam should be irradiated. That is, with reference to a desired sensing field, the X-ray iris 46 shapes the form of the X-ray beam so that unnecessary X-ray irradiation is prevented.

The X-ray beam outputted from the X-ray generator 40 shown in FIG. 1 passes through the subject 50 lying on the X-ray transmission sensing bed 48 and the sensing bed 48, and then is incident on the X-ray detector 52. Note that the sensing bed 48 is controlled by the sensing control circuit 24 so that the X-ray beam passes through a different part of the subject 50 or in a different direction. Also, when the thin X-ray detector 152 is used, the operator 21 adjusts the thin X-ray detector 152 and the subject 50 so that the X-ray beam outputted from the X-ray generator 40 passes through the subject 50 and then is incident on the thin X-ray detector. At this time, in order to limit a sensing field, a sensing field designating means (not shown) is preferably added to the thin X-ray detector 152 to enable designation of a field in which sensing is to be performed. Also, when setting has been made to enable designation of the X-ray sensing field in an interlocked manner with the X-ray iris 46, it is preferable that a sensing field display means (not shown) is provided on the surface of the thin X-ray detector 152 or the like.

The grid 54 of the X-ray detector 52 in FIG. 1 reduces an influence of X-ray scattering that occurs when the X-ray beam passes through the subject 50. In order to prevent the occurrence of moiré due to the grating ratio between the photodetector array 58 and the grid 54, the sensing control circuit 24 makes the grid 54 vibrate upon X-ray irradiation. In the scintillator 56, the source material of a fluorescent member is excited by high-energy X rays (absorbs the X rays), and fluorescent light in a visible region is generated by recombination energy generated at that time. The X-ray sensor (sensing means) 58 arranged adjacent to the scintillator 56 converts the fluorescent light generated by the scintillator 56 into electric signals. That is, the scintillator 56 converts an X-ray image into a visible light image, and the X-ray sensor (sensing means) 58 converts the visible light image into electric signals. The X-ray exposure amount monitor 60 detects the visible light (proportional to the amount of X rays) having passed through the X-ray sensor (sensing means) 58, and supplies information showing a detection amount thereof to the sensing control circuit. The sensing control circuit 24 controls the high voltage generator 44 based on the X-ray exposure amount information, thereby blocking or adjusting the X rays. The drive circuit 62 drives the X-ray sensor (sensing means) 58 under control of the sensing control circuit 24, and reads out a pixel signal from each photodetector.

The pixel signals outputted from the X-ray detector 52 or the thin X-ray detector 152 shown in FIG. 1 are outputted to the image processing circuit 26 in the X-ray control room 12. Since large noise is caused when X rays are generated in the X-ray room 10, it is required that the signal transmission line from the X-ray detector 52 to the image processing circuit 26 has high noise resistance. In more detail, it is preferable to use a digital transmission system equipped with a high-accuracy error correction function, a twisted-pair line shielded by a differential driver, or an optical fiber.

The image processing circuit 26 in FIG. 1 switches the display form of the image signal based on an instruction issued from the system controller 20. Aside from this operation, the image processing circuit 26 is capable of performing image signal correction, spatial filtering, recursive processing, and the like in a real-time manner and executing gradation processing, scattered ray correction, DR compression processing, and the like. An image processed by the image processing circuit 26 is displayed on the screen of the monitor 30. Concurrently with the real-time image processing, image information (basic image) subjected only to image correction is stored in the storage apparatus 28. Also, based on an instruction issued from the operator 21, the image information stored in the storage apparatus 28 is reconstructed so as to satisfy a predetermined standard (Image Save&Carry (IS&C), for instance), and then is stored on hard discs or the like of the external storage apparatus 34 and the file server 76.

The apparatus in the X-ray control room 12 in FIG. 1 is connected to a LAN (or a WAN) via the LAN board 36. Needless to say, it is possible to connect a plurality of X-ray sensing systems to the LAN. The LAN board 36 outputs image data in accordance with a predetermined protocol (Digital Imaging and Communications in Medicine (DICOM), for instance). An X-ray image is displayed on the screen of the monitor 72 connected to the LAN (or the WAN) as a high-resolution still image or moving image, thereby allowing a doctor to conduct real-time remote diagnosis at substantially the same timing as X-ray sensing.

Figure 2:
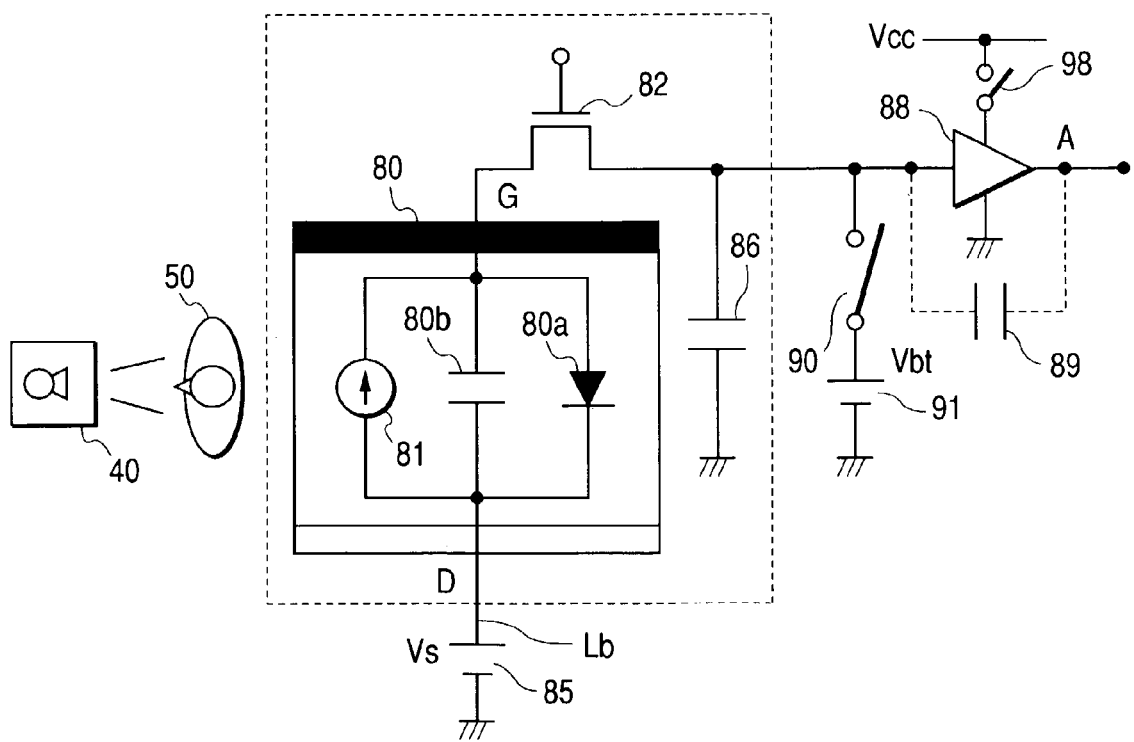
FIG. 2 is an equivalent circuit diagram of a photoelectric conversion element.

FIG. 2 shows an example of the equivalent circuit of one photoelectric conversion element that is the building unit of the X-ray sensor (sensing means) 58. Each photoelectric conversion element is composed of a photodetecting portion 80 and a switching thin-film transistor (TFT) 82 that controls the accumulation and reading-out of charges. The photoelectric conversion element is generally formed using amorphous silicon (a-Si) on a glass substrate. The photodetecting portion 80 further includes a parallel circuit composed of a photodiode 80$a$ and a capacitor 80$b$, in which charges resulting from a photoelectric effect are written as a constant current source 81. It does not matter whether the capacitor 80$b$ is a parasitic capacitance of the photodiode 80$a$ or an additional capacitor used to improve the dynamic range of the photodiode 80$a$. The cathode of the photodetecting portion 80 (photodiode 80$a$) is connected to a bias supply 85 through a bias line Lb that is a common electrode (D electrode). The anode of the photodetecting portion 80 (photodiode 80$a$) is connected to a capacitor 86 and an electric charge reading pre-amplifier (amplifying means) 88 through the gate electrode (G electrode) of the switching TFT 82. The input of the pre-amplifier (amplifying means) 88 is also connected to the ground through a reset switch 90 and a signal line bias supply 91. In this embodiment shown in FIG. 2, power supplied to the photoelectric conversion element in a portion designated as a sensing field is adjusted by a control signal from a drive circuit (not shown) that adjusts or turns ON/OFF power to drive the pre-amplifier (amplifying means) 88. It is possible to reduce power consumption of the photoelectric conversion element by adjusting the power supplied to the pre-amplifier (amplifying means) 88. In particular, when a large-area X-ray sensor (sensing means) 58 is constructed using the photoelectric conversion element, there is achieved an enormous power saving effect through the adjustment of power supplied to the photoelectric conversion element in a range in which sensing is not required. This is because the X-ray sensor (sensing means) 58 is produced using photoelectric conversion elements whose number is on the order of several ten thousands.

Next, a reading method for the photoelectric conversion sensing apparatus will be described with reference to FIG. 2. The reading procedure is broadly divided into three stages that are resetting, accumulation, and reading. During the resetting, the switching TFT 82 and the reset switch 90 are temporarily turned on, thereby resetting the capacitor 80$b$.

During the accumulation, the switching TFT 82 and the reset switch 90 are turned off. Following this, X rays are generated and the subject 50 is exposed. Then, the scintillator 56 converts an X-ray image obtained through transmission of X rays through the subject 50 into a visible ray image and the photodiode 80$a$ goes into a conductive state by the visible ray image, thereby having the capacitor 80$b$ discharge the charges. During the reading, the switching TFT 82 is turned on, thereby establishing connection between the capacitor 80$b$ and the capacitor 86. As a result of this operation, information concerning the discharge amount of the capacitor 80$b$ is also transmitted to the capacitor 86. A voltage corresponding to the charge accumulated in the capacitor 86 is amplified by the pre-amplifier 88 (amplifying means), or the charge is converted into a voltage by a capacitor 89 indicated by the dotted line, and the voltage is outputted to the outside.

Figure 3:
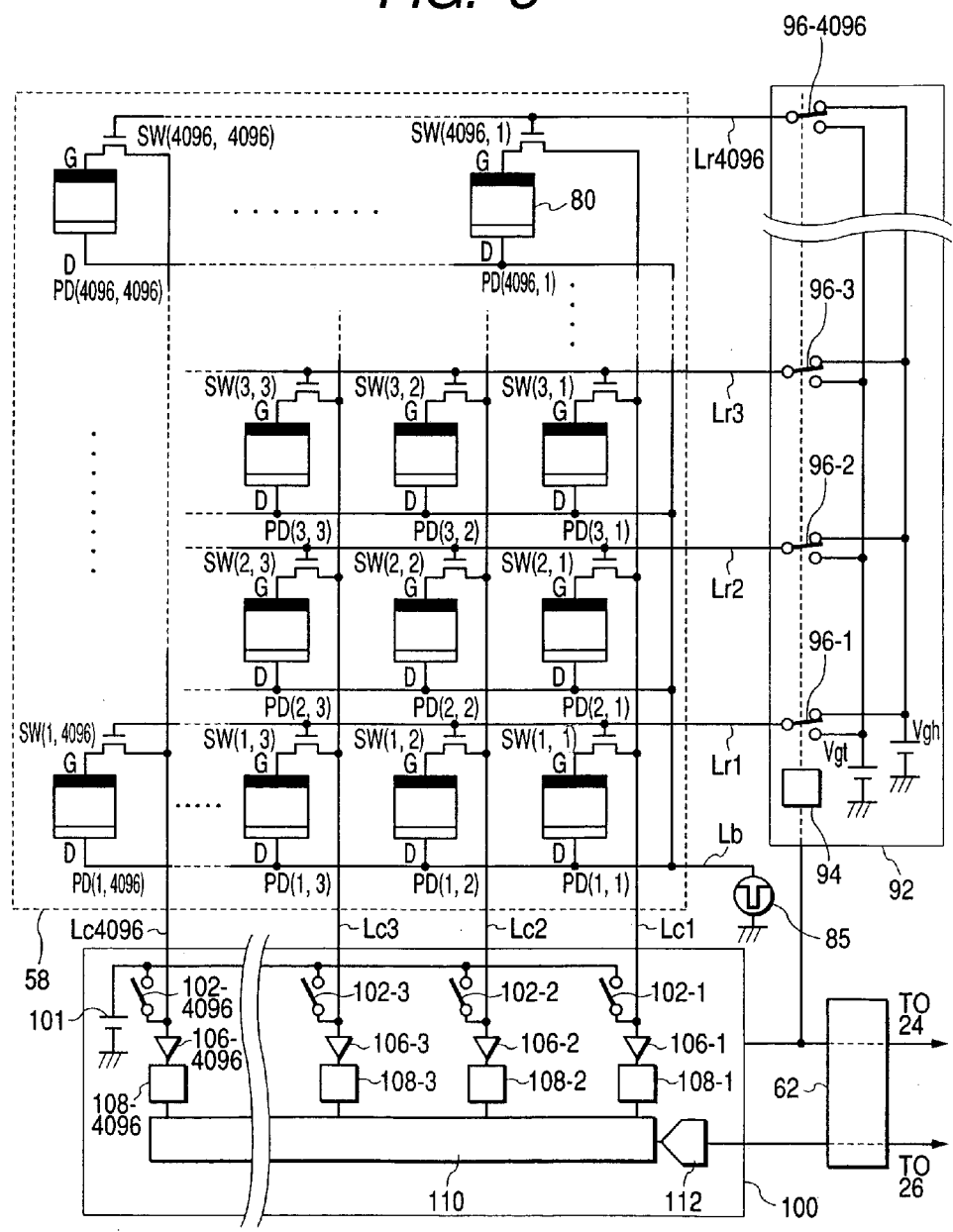
FIG. 3 shows an example of the construction of a sensing means.

Next, a photoelectric conversion operation performed when the photoelectric conversion element shown in FIG. 2 is arranged in a two-dimensional manner will be described with reference to FIG. 3. FIG. 3 shows an equivalent circuit of the X-ray sensor (sensing means) 58 equipped with the photoelectric conversion elements arranged two-dimensionally. The same two-dimensional reading operation is performed in the two kinds of equivalent circuits described above, so that FIG. 3 is realized using the equivalent circuit shown in FIG. 2.

The X-ray sensor (sensing means) 58 is composed of around 2000×2000 to 4000×4000 photoelectric elements and area of an array is around 200 mm×200 mm to 500 mm×500 mm. The output from each photoelectric conversion element corresponds to one pixel. Therefore, in FIG. 3, the X-ray sensor (sensing means) 58 is composed of 4096×4096 pixels and its array area is 430 mm×430 mm. Consequently, the size of one pixel becomes around 105 $\mu$m×105 $\mu$m. 4096 pixels arranged in a horizontal direction are set as one block and 4096 blocks are arranged in a vertical direction, thereby obtaining a two-dimensional construction.

As described with reference to FIG. 2, each photoelectric conversion element is composed of one photodetecting portion 80 and one switching TFT 82. In FIG. 3, there are illustrated photoelectric conversion elements PD (1, 1) to (4096, 4096) and transfer switches SW (1, 1) to (4096, 4096) that are each a switching TFT. The gate electrode (G electrode) of each photoelectric conversion element PD (m, n) is connected to a corresponding common column signal line Lcm through a corresponding switch SW (m, n). For instance, the photoelectric conversion elements PD (1, 1) to (4096, 1) of the first column are connected to a first column signal line Lc1. The common electrodes (D electrodes) of respective photoelectric conversion elements PD (m, n) are all connected to the bias supply 85 through the bias line Lb.

Control terminals of the switches SW (m, n) on the same row are connected to a common row select line Lrn. For instance, the switches SW (1, 1) to (1, 4096) of the first row are connected to a row select line Lr1. The row select lines Lr1 to Lr4096 are connected to the sensing control circuit 24 through a line selector (reading range designating means) 92. The line selector (reading range designating means) 92 is composed of an address decoder 94 that decodes a control signal from the sensing control circuit 24 and determines a line from which signal charges of photoelectric conversion elements are to be read out, and 4096 switch elements 96 that are opened/closed in accordance with an output from the address decoder 94. With this construction, it becomes possible to read out signal charges of photoelectric conversion elements PD (m, n) connected to switches SW (m, n) connected to an arbitrary line Lrn. As a result, it becomes possible to read out signals only from necessary photoelectric conversion elements.

With the simplest construction, the line selector (reading range designating means) 92 may be constructed using a shift register that is, for instance, used in a liquid crystal display. In this embodiment, only a field, in which line sensing is to be performed, is selected using the address decoder 94, so that an effect is achieved that enables to shorten a time taken to read accumulated charges. In particular, this effect becomes necessary at a medical site at which displaying in a short time period is required. Further, when the X-ray sensor (sensing means) 58 is applied to a moving image, there is achieved an effect that a frame rate is increased.

The column signal lines Lc1 to Lc4096 are connected to a signal reading circuit 100 controlled by the sensing control circuit 24. In the signal reading circuit 100, reference numerals 102-1 to 102-4096 denote reset switches that respectively reset the column signal lines Lc1 to Lc4096 to a reset reference potential 101. Also, reference numerals 106-1 to 106-4096 represent pre-amplifier (amplifying means) that respectively amplify signal potentials from the column signal lines Lc1 to Lc4096, numeral 108-1 to 108-4096, sample/hold (S/H) circuits that respectively sample and hold outputs from the pre-amplifiers 106-1 to 106-406, numeral 110, an analog multiplexer that multiplexes outputs from the S/H circuits 108-1 to 108-4096 on a time axis, and numeral 112, an A/D converter that digitizes an analog output from the multiplexer 110. An output of the A/D converter 112 is supplied to the image processing circuit 26. Also, power (not shown) to drive the pre-amplifiers (amplifying means) 106-1 to 106-4096 are independently controlled by a control signal from the sensing control circuit 24, which makes it possible to drive only necessary photoelectric conversion elements. As a result, there is achieved an effect of reducing power consumption of the X-ray sensor (sensing means) 58. With this construction, driving of the photoelectric conversion elements arranged in a row direction is controlled. However, it is also possible to obtain a construction where driving of each photoelectric conversion element is adjusted by independently controlling the driving of each photoelectric conversion element.

In the photodetector array shown in FIG. 3, 4096×4096 pixels are divided into 4096 columns by the column signal lines Lc1 to Lc4096, signal charges from 4096 pixels per row are read out at the same time, the read-out signal charges are transferred to the analog multiplexer 110 through respective column signal lines Lc1 to Lc4096, the pre-amplifiers (amplifying means) 106-1 to 106-4096, and the S/H circuits 108-1 to 108-4096. Then, multiplexing on a time axis is performed in the analog multiplexer 110, and signals are converted into digital signals by the A/D converter 112 in succession. That is, although there is shown a construction where signals are read out in units of columns, there may be obtained a construction where the switch 96 is provided for each photoelectric conversion element and independent reading of the photoelectric conversion elements is performed.

According to the present invention, the switch 98 is provided to adjust power supplied to the pre-amplifier (amplifying means) 88 of each photoelectric conversion element, so that only the photoelectric conversion elements in a sensing range are placed in a ready state. In FIG. 3, this mechanism to supply power only to photoelectric conversion elements in the sensing field is achieved by adjusting power input to the pre-amplifiers (amplifying means) 88 (given reference numerals 106-1 to 106-4096 in FIG. 3) with a drive means (not shown) that is controlled by the sensing control circuit 24.

Also, in order to limit the sensing range in the vertical direction in FIG. 3, the line selector (reading range designating means) 92 decodes a control signal from the sensing control circuit 24 and determines each line, from which signal charges of photoelectric conversion elements are to be read out, through the address decoder 94. As a result, each switch element 96 corresponding to a range designated as the sensing range is opened/closed.

Second Embodiment

Figure 4:
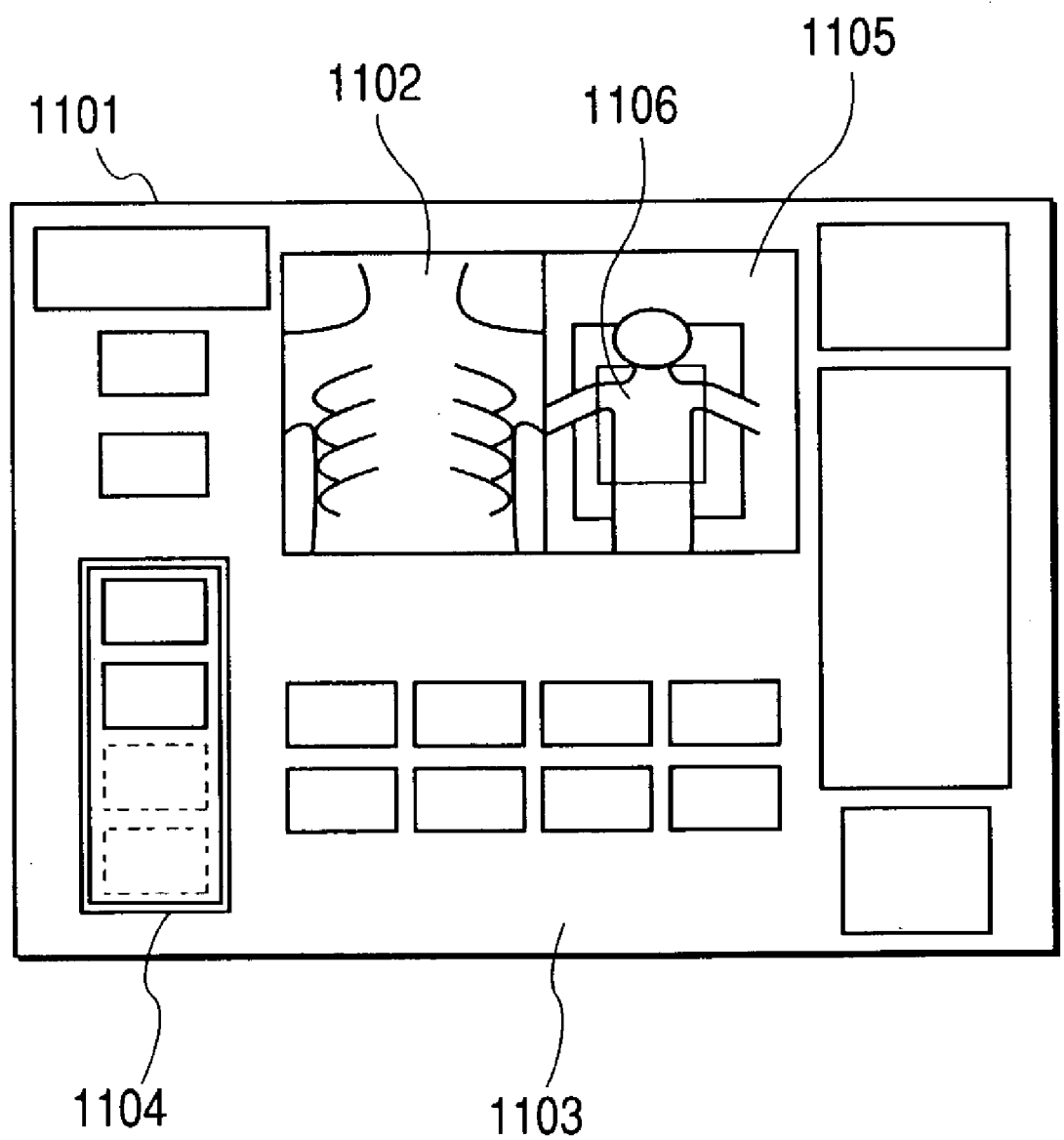
FIG. 4 shows an example of the construction of a display means through which an X-ray sensing apparatus is operated.

FIG. 4 shows a display means for designating an X-ray image sensing field using an operation means of the X-ray sensing apparatus. A method of designating a range in which the photoelectric conversion elements are to be driven, and a range in which output signals are to be read out from the photoelectric conversion elements with the X-ray sensing apparatus operation means, will be described with reference to FIG. 4. Reference numeral 1101 denotes an example of a display screen. As the display means, there is used a touch-panel-type display apparatus with which it is possible to perform input by directly touching the screen with a finger, a pen, or the like. Reference numeral 1102 represents an area in which a reduced and simplified image of a sensed image is displayed. When there is used the thin X-ray detector 152, re-processing is performed based on an image transferred by previous wireless communication and image displaying is performed in this display area 1102. Reference numeral 1103 indicates buttons for displaying a sensing target range corresponding to the X-ray detector 52 or the thin X-ray detector 152. Prior to sensing, selection of the buttons 1103 is performed to specify the sensing target. Reference numeral 1104 denotes an effective X-ray detector display area, in which there is displayed an icon representing the X-ray detector 52 or the thin X-ray detector 152 that is placed in a state where control by the system controller 20 is possible. Reference numeral 1105 indicates an image picked-up by the CCD camera 47, while reference numeral 1106 indicates the photoelectric conversion element driving range or the photoelectric conversion element signal reading range. An image of the sensing apparatus and a patient to be sensed is picked-up by the CCD camera 47 attached to the X-ray tube through a sensing path whose alignment is approximately equal to that of the X rays emitted from the X-ray tube, and the picked-up image is displayed as the image 1105. The image 1105 is displayed on the touch panel, so that it is possible to designate a sensing field by specifying the photoelectric conversion element driving range or the photoelectric conversion element signal reading range 1106 by touching the touch panel, which is a display apparatus, with a finger or a pen.

In this case, for instance, there are specified in advance certain coordinates of the X-ray sensor (sensing means) 58 (coordinates on four corners of the X-ray sensor, for instance) displayed on the display image 1105. Then, a position relationship between coordinates on the display image 1105 and the coordinates on the X-ray sensor (sensing means) is calculated in advance from the specified coordinates and is stored. As a result, it becomes possible for the sensing control circuit 24 to calculate the coordinates on the X-ray sensor (sensing means) 58 from the coordinates of the field 1106 designated with a finger or a pen through the touch panel.

Also, if there is used the X-ray sensor (sensing means) 58 of the first embodiment, when the field 1106 is specified, there is simultaneously determined the photoelectric conversion element driving range or the photoelectric conversion element signal reading range. In this manner, by using an image picked up by the CCD camera 47, whose alignment is approximately equal to that of the X rays emitted from the X-ray tube, there is achieved an effect of enabling designation of a field on the X-ray sensor (sensing means) 58 from the display apparatus 1101 with ease. Also, it becomes possible to designate the field on the X-ray sensor (sensing means) 58 while actually confirming the sensing target on the display apparatus 1101. As a result, there is achieved an effect of enabling designation of the minimum required field with accuracy.

Next, when the buttons 1103 are pushed, subject information on the selected sensing target is read into the sensing control circuit 24 from the storage apparatus 28. Here, the subject information means patient information showing the physique, part to be sensed, gender, age, nationality, race, and the like. At this time, instead of assigning the subject information to the buttons 1103, there may be used a construction where each field, into which the subject information of the patient is to be inputted, is provided on the display screen 1101. For instance, a sensing field to be used is roughly determined depending on whether the patient is a child or a male adult. In a like manner, a range to be used for sensing is roughly determined by the patient information concerning the physique and the like. Accordingly, in this case, merely by designating the center of the sensing field through the touch panel, it is possible to designate the photoelectric conversion element driving range or the photoelectric conversion element signal reading range of the X-ray sensor (sensing means) 58. When such a construction is used, there is achieved an effect that when a large number of subjects in the same category are to be sensed, for instance, it becomes possible to designate a field suited to the subjects. This is because if the category of the subjects is determined on the basis of the subject information, the field necessary for sensing is statistically or experimentally determined.

Third Embodiment

Figure 5:
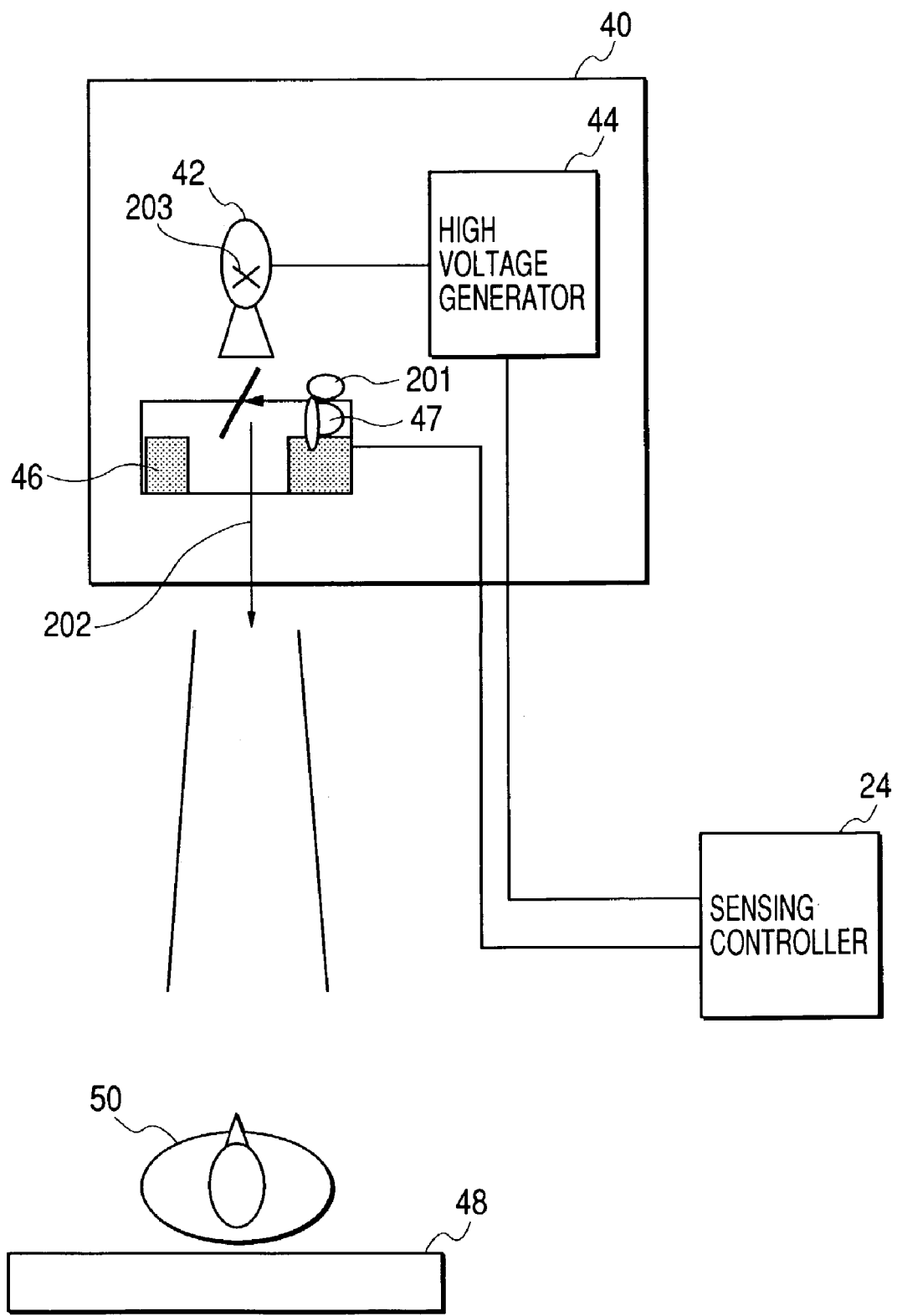
FIG. 5 shows a construction for designating an X-ray image sensing field in an interlocked manner with the iris of a tube.
Figure 6:
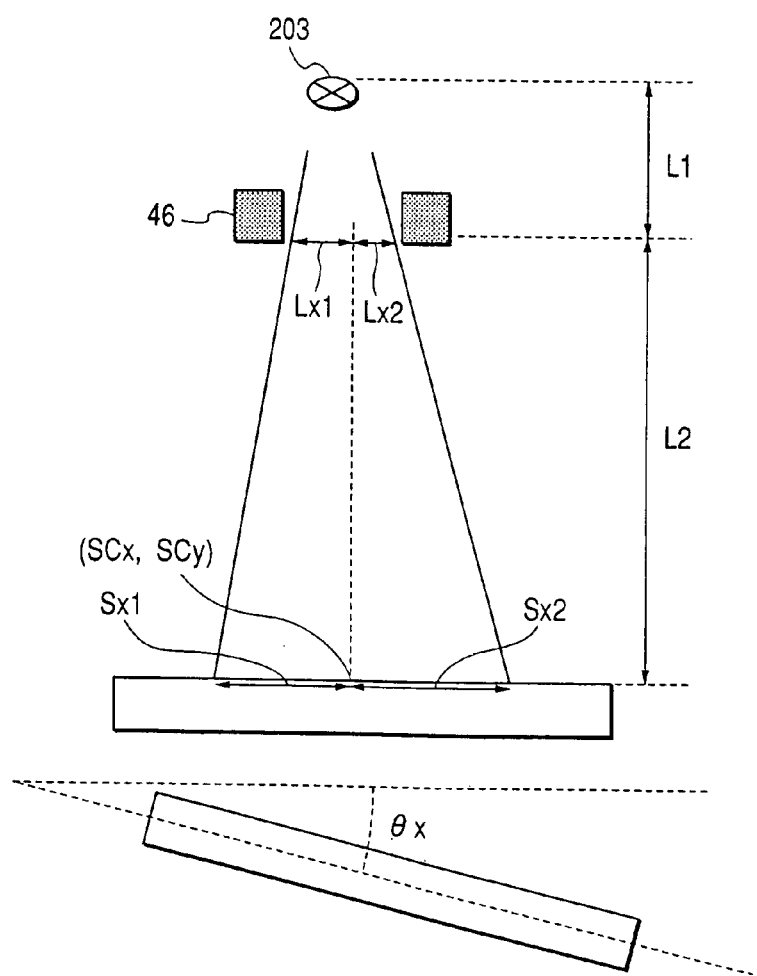
FIG. 6 shows a calculation method used by an apparatus that designates the X-ray image sensing field in the interlocked manner with the tube iris.

FIG. 5 shows the construction of an apparatus that designates an X-ray image sensing field in an interlocked manner with a tube iris, while FIG. 6 shows a calculation method for designating the X-ray image sensing field in an interlocked manner with the tube iris used for this apparatus. A method of designating the sensing range in an: interlocked manner with the iris of the X-ray generator will be concretely described with reference to FIGS. 5 and 6.

As shown in FIG. 5, the X-ray generator 40 includes the X-ray tube 42 that generates X rays, the high voltage generator 44 that drives the X-ray tube 42 under control of the sensing control circuit 24, and the X-ray iris 46 that narrows the X-ray beam generated by the X-ray tube 42 to a desired sensing field. Here, the X-ray iris is generally produced using lead or the like in order to block the X rays. The X-ray generator 40 is provided with a visible light source 201, such as a light bulb, in order to display a sensing field narrowed by the X-ray iris 46. The position relationship between this visible light source 201 and the X-ray iris 46 is optically and approximately equal to a position relationship between a focal point 203 of the X-ray tube 42 and the X-ray iris 46. As a result, a range illuminated by the visible light 202 is approximately equal to a range to be irradiated with X rays.

There will be described an embodiment in which the sensing field is calculated only from geometric relationships among the X-ray tube, the amount of the X-ray iris, and the X-ray sensing apparatus. Information that is necessary to calculate the sensing field includes a distance (L1+L2) between the X-ray tube and the X-ray sensing apparatus, distances (Lx1, Lx2, Ly1, and Ly2) from the center of each collimator, position information (SCx, Scy) showing a position of a portion of the X-ray sensing apparatus to which the center point of the X rays generated from the X-ray tube reaches, and inclinations (θ x, θ y) y) between the X-ray tube and the surface of the X-ray sensing apparatus.

Also, information that is necessary for the setting of the apparatus includes a distance L1 from the focal point of the X-ray tube to the collimator. When, based on these information, a range of the X-ray sensing apparatus to be irradiated with the X rays is set as a range surrounded by (Ssx1, Ssy1), (8Ssx1, Ssy2), (Ssx2, Ssy1), and (Ssx2, Ssy2), these coordinates are calculated as follows.

$$Ssx1 = SCx - (L1+L2) \cdot Lx1 \cdot \cos\theta\, x / L1 \qquad \text{(Formula 1)}$$

$$Ssy1 = SCy - (L1+L2) \cdot Ly1 \cdot \cos\theta\, y / L1 \qquad \text{(Formula 2)}$$

$$Ssx2 = SCx + (L1+L2) \cdot Lx2 \cdot \cos\theta\, x / L1 \qquad \text{(Formula 3)}$$

$$Ssy2 = Scy + (L1+L2) \cdot Ly2 \cdot \cos\theta\, y / L1 \qquad \text{(Formula 4)}$$

It should be noted here that the above calculation is performed by assuming that the range irradiated with the X rays, which has been limited by the collimator, has a rectangular shape or a square shape. However, even if the range irradiated with the X rays, which has been limited by the collimator, has an elliptic shape or a circular shape, the X-ray range irradiated with X rays may be calculated through the same calculation as above. It is preferred that among these variables, both of the inclinations (θ x, θ y) between the X-ray tube and the surface of the X-ray sensing apparatus are set at "0" by placing a mirror on the surface of the X-ray sensing apparatus in advance and by utilizing reflection resulting from illumination with a light bulb.

By using a range containing the X-ray sensing range obtained in the manner described above, there are determined the row select line Lrn and a range in which power supply to the pre-amplifiers (amplifying means) is to be performed. Here, there may be obtained a construction where it is possible to perform, through setting, selection among an operation where there is used only a range in which the X-ray sensing range is larger than an X-ray irradiation range, an operation where there is used only a range in which the X-ray sensing range is smaller than the X-ray irradiation range, or the like. With this construction, there is achieved an effect that by measuring necessary information in advance, it becomes possible merely by measuring the iris amount of the X-ray tube to determine the driving range or reading range of the X-ray sensor.

Fourth Embodiment

Figure 7:
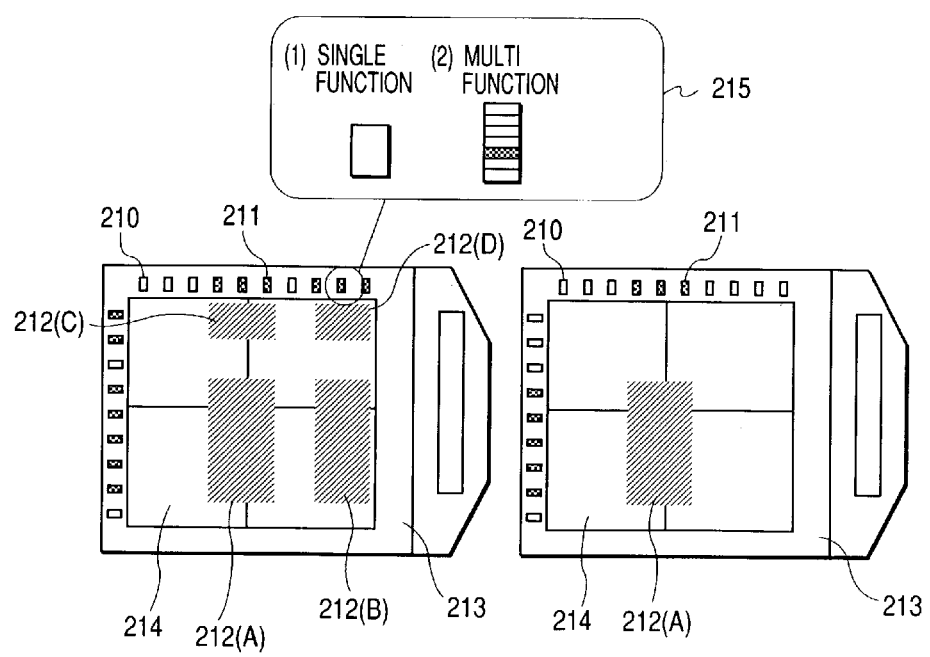
FIG. 7 shows a construction with which the X-ray image sensing field is designated with means attaching to the X-ray sensing apparatus.

FIG. 7 shows an example of a construction where the X-ray image sensing field is designated by means 210 and 211 attaching to the X-ray sensor (sensing means) 58. That is, there will be described a method with which it is possible to designate the driving range or reading range of the X-ray sensor (sensing means) by designating the X-ray sensing range with the means 210 and 211 provided for the X-ray sensing apparatus. As shown in FIG. 7, the attaching means 210 and 211 of the sensing means that are provided in the X-ray sensing apparatus in order to designate the X-ray sensing range are positioned outside of a possible sensing region (for instance, in a peripheral region of the sensing means in which no photoelectric conversion element is provided), and are set at positions at which the X-ray image sensing field is easily found by intuition from the position relationship with the X-ray image sensing field. In FIG. 7, buttons 210 are provided as the attaching means respectively corresponding to the photoelectric conversion elements. Among these buttons, only buttons corresponding to photoelectric conversion elements to be used are lit up. Buttons 211 (another attaching means) that are lit up by LEDs or the like indicate a state where their corresponding photoelectric conversion elements are to be used. It is possible to imagine sensing fields 212 with reference to the lit-up buttons 211 because the sensing range (212(A), for instance) is determined by the vertical and horizontal AND relationships of the lit-up buttons 211. Each of element numerals 213 and 214 indicates an area of image sensing field and an area out of image sensing field, respectively.

However, when there exist a plurality of sensing fields (212(A) and 212(D), for instance), there is a case where the fields 212(C) and 212(B) are imagined as ghost fields. Therefore, when a plurality of fields are designated, there may be obtained a construction where, as indicated by reference numeral 215, the buttons 210 provided in the peripheral region in a horizontal axis direction are further divided and a coordinate in a vertical axis direction is also indicated.

When the buttons 210 that are the attaching means are pushed, these buttons are lit up as the buttons 211 and, at the same time, there is designated the driving range or reading range of the X-ray sensor (sensing means) 58. That is, the sensing control circuit 24 analyzes and determines the driving range or reading range from the position information of the buttons 211. Also, as another construction, there may be obtained a construction where the lit-up buttons 211 are mechanically interlocked with the switches 96 of the line selector (reading range designating means) 92 or an ON/OFF switch (not shown) of the drive means for adjusting power supplied to the pre-amplifiers (amplifying means) 88.

Fifth Embodiment

Figure 8:
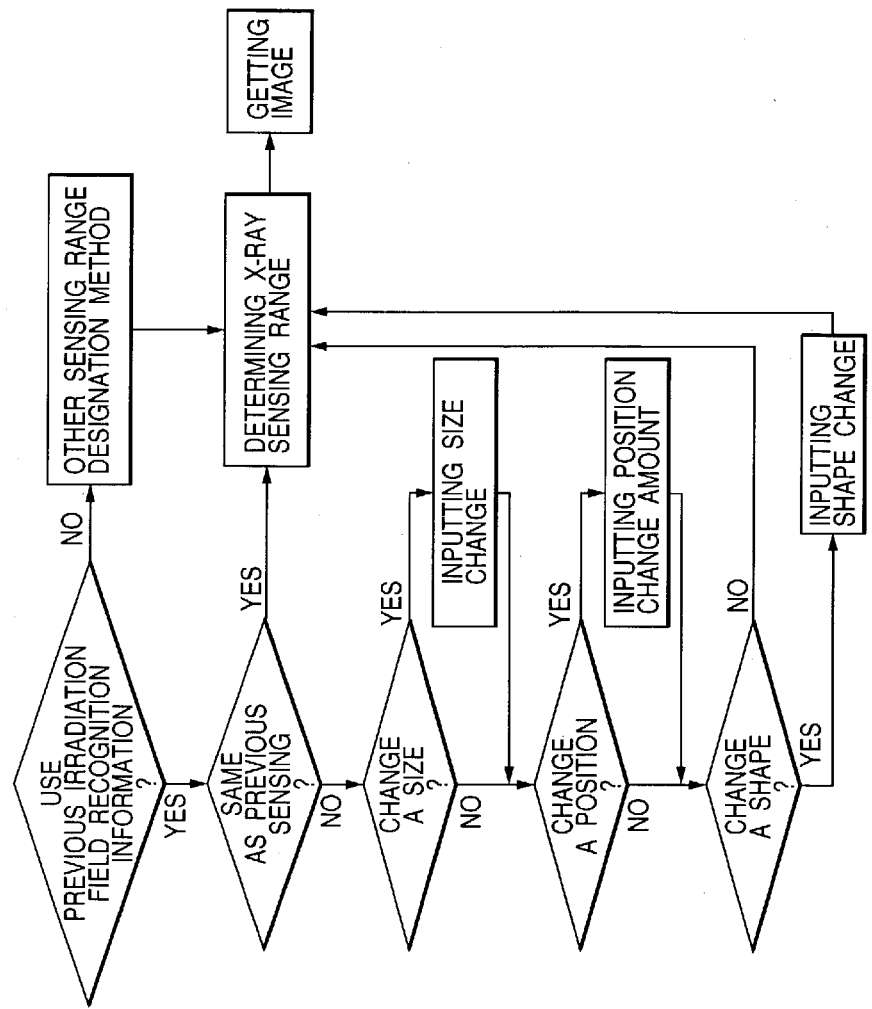
FIG. 8 shows a method of designating the X-ray image sensing field with irradiation field recognition information of previous sensing.
Figure 8:
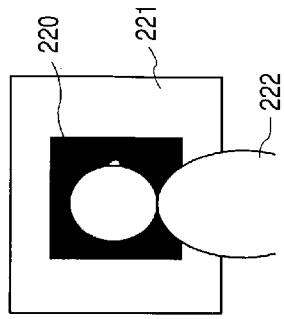

FIG. 8 illustrates a method with which an X-ray image sensing field is designated with irradiation field recognition information of previous sensing. A method of designating an X-ray sensing range with irradiation field information of immediately-previous sensing will be described with reference to FIG. 8. In this embodiment, the irradiation field range of an immediately-previous image is used as it is, or a range obtained through movement by a predetermined distance based on irradiation field range information of the immediately-previous image is set as the driving range or reading range (sensing range) of the X-ray sensor (sensing means) 58. It is possible to realize such irradiation field recognition by executing the irradiation field recognition method disclosed in Japanese Patent Application Laid-Open No. 2000-271107 or the like in the image processing circuit 26. Then, the sensing control circuit 24 analyzes and determines the driving range or reading range based on a result of the irradiation field recognition by the image processing circuit 26. Each of element numerals 220, 221 and 222 indicates an area of image sensing field, an area out of image sensing field and a subject, respectively.

Here, when it is known in advance that the irradiation field range (sensing field) moves with a certain regularity, the sensing control circuit 24 may set the driving range or the reading range in succession in accordance with the movement of the irradiation field range. With this construction, when a baggage placed on a line belt is sensed by moving the sensing field of a two-dimensional flat radiation detecting means during a baggage X-ray inspection at an airport, for instance, there is achieved an effect of power saving and shortening of a read-out time.

Also, even if the irradiation field range itself is fixed, when it is known in advance that the subject itself moves with a certain regularity, there may be obtained a construction where the sensing control circuit 24 sets the driving range or the reading range in succession in accordance with the movement of the subject. Also, with this construction, when sensing is performed by moving the sensing field, there is obtained the effect of power saving and shortening of a read-out time.

An example of process flow of this sensing is shown in FIG. 8. When the designation of a sensing range is performed using previous irradiation field recognition information, it is first checked whether there occurs no problem if the sensing is performed in the same manner as the previous sensing. Next, it is checked whether it is possible to use the sensing range obtained at the time of previous sensing as it is. As a result of these operations, there is achieved an advantage that even when there is obtained a negative result, it is possible to use the irradiation field recognition information of previous sensing by changing the size, position, shape, and the like. Note that the "previous" irradiation field recognition information refers to any image sensed before a current image and therefore is not necessarily an image obtained as a result of immediately-previous sensing.

Sixth Embodiment

In this embodiment, there will be described a case where a moving image is sensed using the sensor (sensing means) 58. In this case, the sensing control circuit 24 first finds a portion in which a subject moves, by calculating differences between images obtained by picking-up the subject over time using the CCD camera 47. The sensing control circuit 24 then sets only the moving portion as the driving range and/or reading range of the sensor (sensing means) 88. As a result, there is achieved an effect that an image read-out time or the like is shortened and image data amount is reduced. It is possible to say that a hardware-like moving image compression process is performed in this embodiment.

Seventh Embodiment

Figure 9:
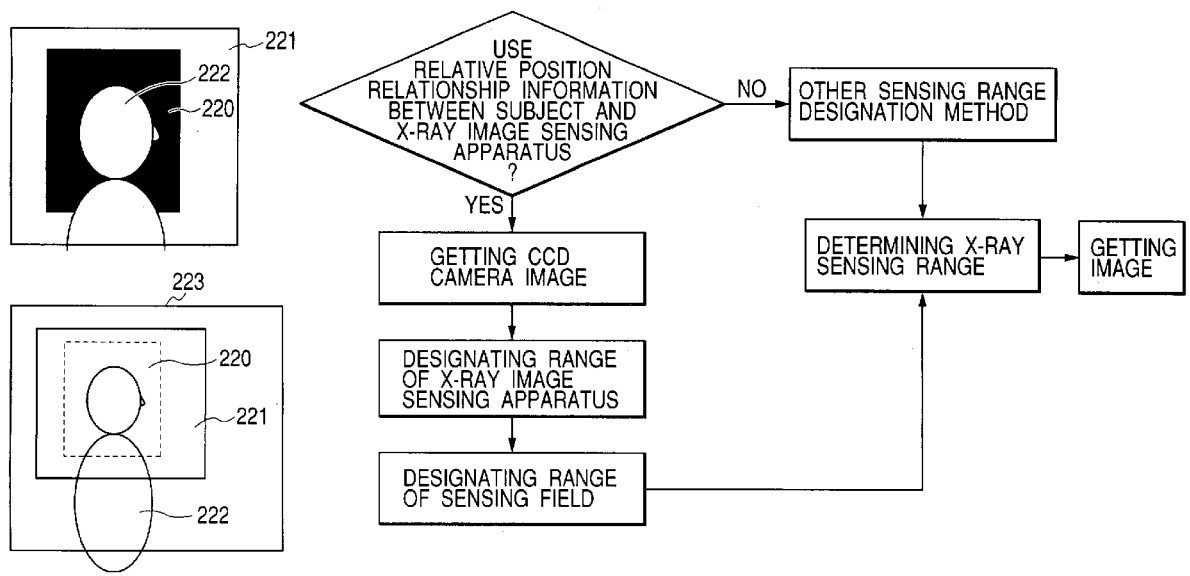
FIG. 9 illustrates a method of designating the X-ray image sensing field with relative position relationship information between a subject and the X-ray image sensing apparatus.

FIG. 9 illustrates a method with which the driving range and/or reading range of the sensor (sensing means) 58 are/is designated with relative position relationship information between the subject and the X-ray sensing apparatus. A method based on the relative position relationship information between the subject and the X-ray sensing apparatus will be described with reference to FIG. 9. Element numeral 223 indicates a CCD camera image displaying area.

The relative position relationship information between the subject and the X-ray sensing apparatus is referred to in order to find the sensing range in the X-ray sensing apparatus, so that it is not required to find three-dimensional position relationship information. Therefore, it is preferred that a small-sized camera, such as a CCD camera, is installed at a position that is optically adjacent to the focal point of the X-ray tube, for instance.

Eighth Embodiment

In this embodiment, there will be described a method with which an X-ray sensing range is determined using the CCD camera 47. An image picked-up by the CCD camera is displayed on the monitor, so that it is possible for the operator to know, prior to X-ray sensing, a geometric position relationship between the X-ray sensing apparatus and the subject when viewed from the X-ray generator. The operator first designates a range of the X-ray sensing apparatus using a mouse or the like, and then designates a range to be used for sensing using the mouse or the like. These information may also be automatically obtained through image processing. Also, when the information is to be automatically obtained through the image processing, there may be used inputted information other than the sensing range that shows the part to be sensed, gender and age of the patient, a sensor tube distance, and the like designated by the operation means of the X-ray sensing apparatus. From the relative position relationship between the designated and obtained range of the X-ray sensing apparatus on the image picked-up by the CCD camera and the range to be sensed, there is obtained information of, for instance, amplifier photoelectric conversion elements to be used. By using the inverse functions of the geometric position relationships (Formulas (1) to (4)) described with reference to FIGS. 5 and 6, it becomes possible to know a moving degree of the iris 46 of the X-ray generator with which only a minimum required amount of X rays is generated to the outside. As a result, it becomes possible to obtain a construction where the iris 46 of the X-ray generator is automatically moved.

An image of the range indicating the sensing field in FIG. 9 may be picked-up with the CCD camera 47 or the like attached to the X-ray tube while the range is being illuminated by a light bulb, and a range of the two-dimensional flat sensor to be used for sensing may be calculated and designated by performing image processing on the picked-up image.

A calculation procedure for conducting the above-mentioned calculation will be described below. In a first step, the range to be used for sensing by the X-ray image sensing apparatus is searched for through pattern recognition or the like of the image obtained by the CCD camera attached to the X-ray tube. At this time, aside from the image obtained by the CCD camera, there may be used supplementary information that shows the distance between the X-ray tube and the sensor, the kind and size of the X-ray image sensing apparatus to be used, and the like. With this construction, there is increased the speed and accuracy of the calculation. Also, aside from automatic recognition, a range to be used for sensing may be designated by specifying a range of the X-ray image sensing apparatus illuminated with visible light from above of the image, for instance.

In a second step, a sensing field is calculated by finding a range in which hue information is changed by the visible light, through image processing with reference to the position of the selected range of the X-ray image sensing apparatus.

In a third step, a photoelectric conversion element block to be used for sensing is designated from (1) the obtained sensing field and (2) photoelectric conversion element block information at the time of arrival of the X-ray image sensing apparatus.

In a fourth step, parameters in the control apparatus are changed so that there are used only amplifier photoelectric conversion elements that are necessary in each sensing stage, such as null reading, reading at the time of sensing, reading after sensing, and the like.

Also, when the present two-dimensional flat radiation detecting means is applied to a moving image or the like, there is a case where it is sufficient that only a certain part is sensed and it is not required to sense other parts. As an example thereof, it is possible to cite a case where it is desired to confirm the insertion position of a catheter at the time of a heart bypass operation with the present two-dimensional flat radiation detecting means. In such a case, sensing of an entire sensing range is performed only for the first frame, and only a required part is sensed for the second and following frames and is combined with the entire range image. In particular, when partial ready or partial reading of a sensing field is performed during the sensing of a moving image, by changing the sensing field for each frame, there is obtained an effect that the sensing speed is significantly increased. When a moving image is sensed at a rate of 30 frames/second, for instance, it is preferred that the sensing in the entire sensing range is performed only once per second, the sensing in a partial sensing field is performed for the remaining 29 frames per second, and each partial range image is combined with an entire range image.

Also, when it is known in advance that this partial sensing field moves, this field may be moved through control. For instance, when sensing is performed for a baggage placed on a line belt by moving the sensing field of the two-dimensional flat radiation detecting means during a baggage X-ray inspection at an airport, there is achieved an effect of power saving.

Figure 10:
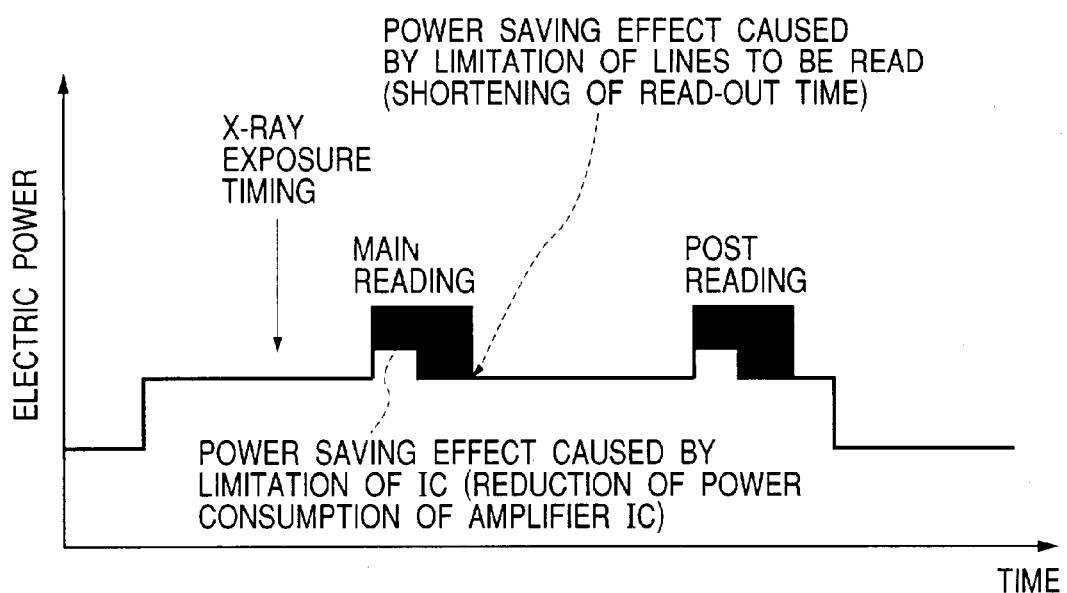
FIG. 10 is a schematic diagram illustrating a power saving effect achieved by the present invention.

FIG. 10 is a schematic drawing showing the power saving effect achieved by the present invention. In FIG. 10, the vertical axis represents electric power and the horizontal axis represents time. Also, the area of a portion schematically specified by these lines corresponds to the total power consumption. With the present invention, an effect of power saving corresponding to the area of a portion surrounded by the sloped lines is achieved. This power saving effect is divided into two effects. A first effect thereof is that power application is performed only for photoelectric conversion elements corresponding to the portion designated as a sensing driving range, thereby reducing the electric power represented by the vertical axis in FIG. 10.

The other effect thereof is that only a line corresponding to the portion designated as the sensing driving range is selected by the address decoder 94, so that a time taken to read out charges after X-ray exposure (main reading) and a time taken to read out charges for correction (post reading) are shortened and therefore there is shortened a time period during which power input to the amplifier photoelectric conversion elements is performed. The feature of the present invention is that as a result of these two effects, there is achieved power saving corresponding to the area of the portion surrounded by the sloped lines in FIG. 10 in terms of both electric power and time.

Also, these operations of the present invention for partially designating the sensing field may be combined with a reading method which includes combination of digital zooming, pixel averaging, or the like based on thinning-out used to accelerate reading of data.

Figures 11, 11A, 11B:
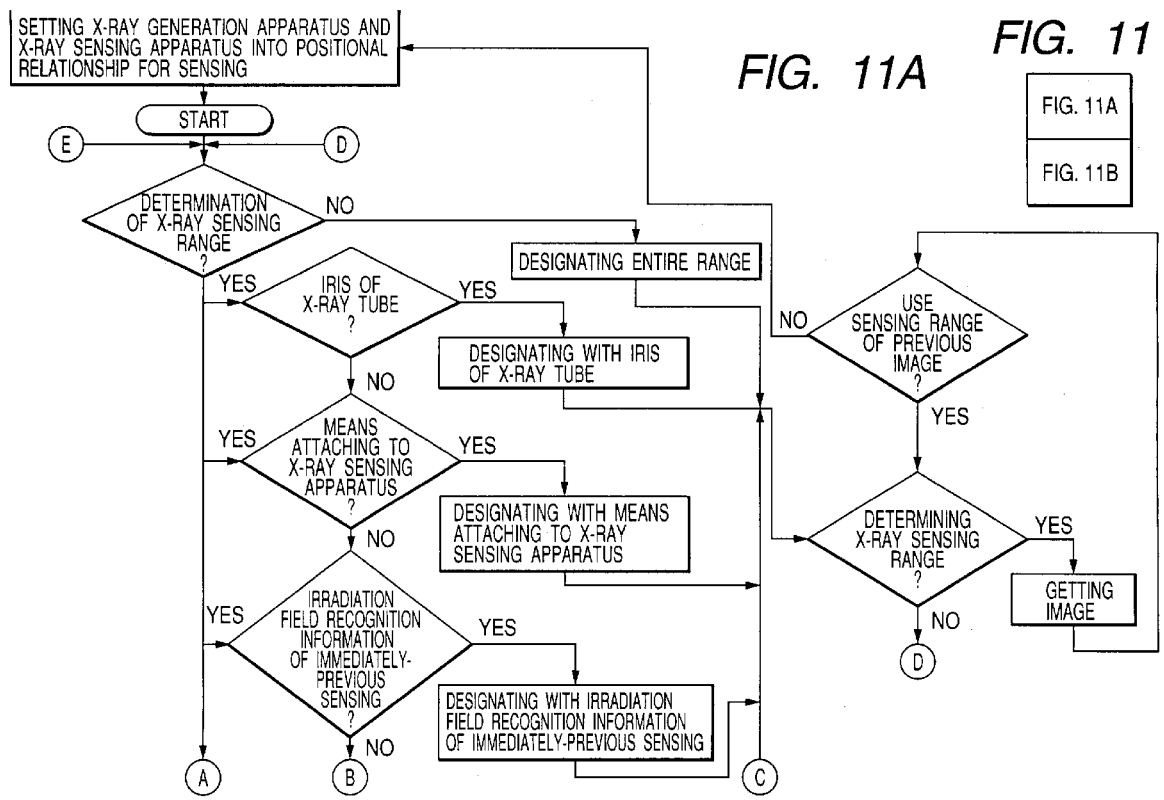
FIG. 11 which is composed of FIGS. 11A and 11B are flowcharts showing a flow for selecting the sensing field.
Figure 11B:
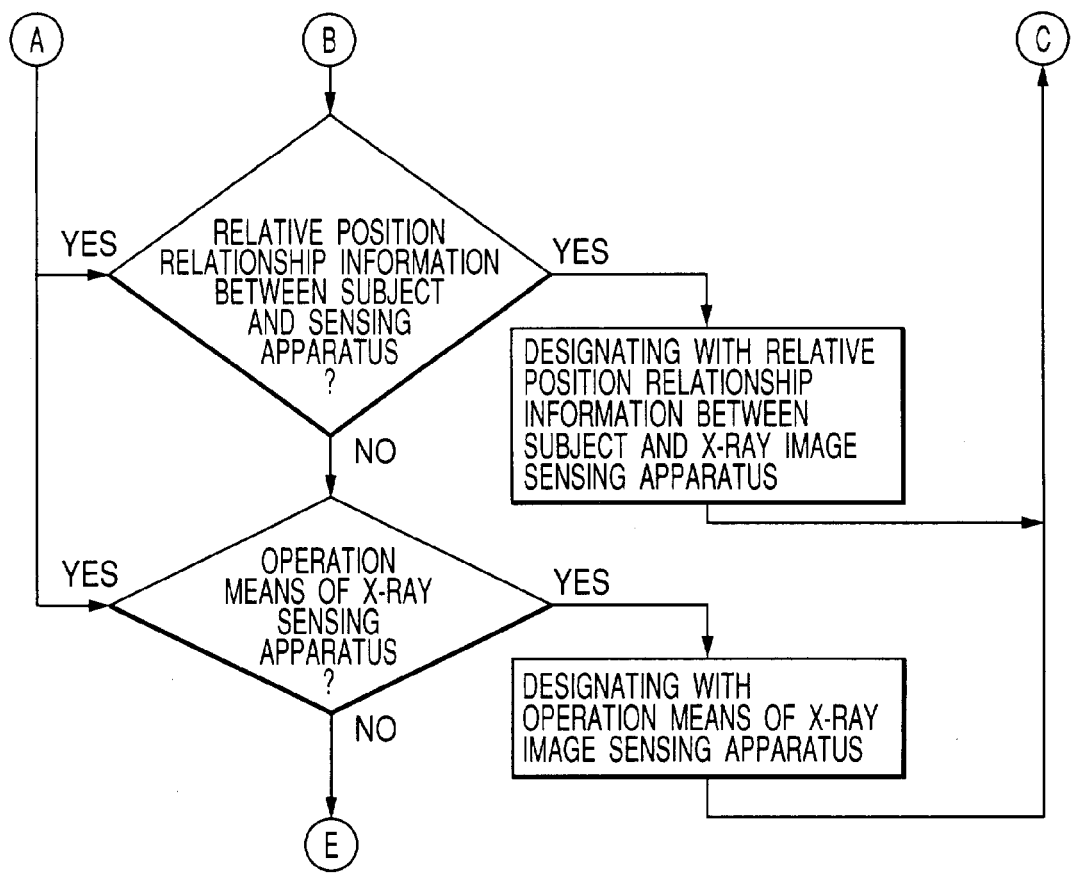

FIGS. 11A and 11B are flowcharts in the embodiment of the present invention. First, positions of the X-ray generator and the X-ray sensing apparatus are set. Next, there is selected whether an X-ray sensing range is to be designated. When the X-ray sensing range is not to be designated, the X-ray sensing apparatus is driven in its entire range. On the other hand, when the X-ray sensing range is to be designated, the sensing range is determined with at least one of (i) the iris of the X-ray tube, (ii) the means attaching to the X-ray sensing apparatus, (iii) the irradiation field recognition information of immediately-previous sensing, (iv) the relative position relationship information between the subject and the sensing apparatus, and (v) the operation means of the X-ray sensing apparatus. Here, the means (ii) attaching to the sensing apparatus is, for instance, the buttons provided on the surface of the case of the X-ray sensing apparatus, as can be seen from FIGS. 11A and 11B. Also, the means other than the means (ii) are operated through the operator interface 22, while the means (ii) is provided on the X-ray detector 52/thin X-ray detector 152 as a means for designating the sensing range. Therefore, it is preferred that the means (ii) is given the highest priority among these means so as to enable the designation even if the flowchart in FIGS. 11A and 11B are not executed. That is, when the entire range of the X-ray sensing apparatus is designated or partial sensing is designated with the means (i) to (v), information showing which part is to be sensed is displayed on the X-ray detector 52/thin X-ray detector 152. When sensing has ended in failure or it is forced to perform sensing again, the exposure amount of X rays is increased, so that it is preferable to refer to the display of the sensing range to prior to sensing without fail. When it is desired to change the sensing range, the means (ii) given the highest priority is preferably used. Also, this highest priority may be assigned to one of the means (v) that performs the designation using an image obtained by the CCD camera or the like or performs the designation through the monitor.

Other Embodiments

It is to be understood that the object of the present invention can also be achieved by supplying a storage medium storing program code of software for implementing the functions of the apparatus or system according to the first or second embodiment to an apparatus or system so that a computer (CPU, MPU, etc.) of the apparatus or system reads and executes the program code stored in the storage medium.

In that case, the program code itself, read from the storage medium, achieves the functions of the first or second embodiment, and thus the storage medium storing the program code and the program code itself constitute the present invention.

The storage medium for providing the program code may be, for example, a ROM, a floppy (registered trademark) disk, a hard disk, an optical disk, a magneto-optical disk, a CD-ROM, a CD-R, a magnetic tape, a non-volatile memory card, etc.

Furthermore, not only by the computer reading and executing the program code, but also by the computer executing part of or the entire process utilizing an OS, etc. running on the computer based on instructions of the program code, the functions of the first or second embodiment may be achieved. The latter is also one of embodiments of the present invention.

Furthermore, the program code read from the storage medium may be written to a memory of a function extension board inserted in the computer or a function extension unit connected to the computer. The functions of the first or second embodiment may be realized by executing part of or the entire process by a CPU, etc. of the function extension board or the function extension unit based on instructions of the program code. This is also one of embodiments of the present invention.

When the present invention is applied to a program or a storage medium storing the program.

It is to be understood that the present invention may also be applied to a system including a plurality of apparatuses (e.g., radiation generating apparatuses, radiographic apparatuses, image processing apparatuses, and interface apparatuses, etc.) and to a single apparatus in which functions of these apparatuses are integrated. When the present invention is applied to a system including a plurality of apparatuses, the apparatuses communicate with one another via, for example, electrical, optical, and/or mechanical means, and/or the like.

Furthermore, the present invention may also be applied to an image diagnosis aiding system including a network (LAN and/or WAN, etc.).

The present invention thus achieves the above-described object as described above.

The present invention is not limited to the above embodiments and various changes and modifications can be made within the spirit and scope of the present invention. Therefore to apprise the public of the scope of the present invention, the following claims are made.

What is claimed is:

1. An X-ray sensing apparatus comprising:
   sensing means including a plurality of elements each converting X-ray into an electric signal;
   pre-amplifiers, which correspond to the plurality of elements, for amplifying the electric signals;
   drive means for driving a power source of said pre-amplifiers;
   driving range designating means for designating a driving range for driving each of the plurality of elements included in said sensing means; and
   display means for displaying said driving range designated by said driving range designating means,
   wherein said drive means controls the power source of said pre-amplifiers corresponding to elements out of a specified region so as to suppress electric power consumption, and
   wherein the driving range is displayed on said sensing means.

2. An X-ray sensing apparatus comprising:
   sensing means including a plurality of elements each converting X-ray into an electric signal;
   pre-amplifiers, which correspond to the plurality of elements, for amplifying the electric signals;
   drive means for driving a power source of said pre-amplifiers;
   driving range designating means for designating a driving range for driving each of the plurality of elements included in said sensing means; and
   display means for displaying said driving range designated by said driving range designating means,
   wherein said drive means controls the power source of said pre-aruplifiers corresponding to elements out of a specified region so as to suppress electric power consumption, and
   wherein when the driving range is displayed on said sensing means, and a display means associated with a coordinate of the driving range is arranged in a peripheral region of said sensing means.

3. An X-ray sensing apparatus comprising:
   sensing means including a plurality of elements each converting X-ray into an electric signal;
   pre-amplifiers, which correspond to the plurality of elements, for amplifying the electric signals;
   drive means for driving a power source of said pre-amplifiers;
   reading range designating means for designating a reading range of the element driven by said drive means; and
   display means for displaying said reading range designated by said reading range designating means, wherein said drive means controls the power source of said pre-amplifiers corresponding to elements out of a specified region so as to suppress electric power consumption, and wherein the reading range is displayed on said sensing means.

4. An X-ray sensing apparatus comprising:

sensing means including a plurality of elements each converting X-ray into an electric signal;

pre-amplifiers, which correspond to the plurality of elements, for amplifying the electric signals;

drive means for driving a power source of said pre-amplifiers;

reading range designating means for designating a reading range of the element driven by said drive means; and display means for displaying said reading range designated by said reading range designating means, wherein said drive means controls the power source of said pre-amplifiers corresponding to elements out of a specified region so as to suppress electric power consumption, and wherein when the reading range is displayed on said sensing means, and a display means associated with a coordinate of the reading range is arranged in a peripheral region of said sensing means.

* * * * *